(12) United States Patent  (10) Patent No.: US 6,215,268 B1
Choi  (45) Date of Patent: Apr. 10, 2001

(54) WASHING ROBOT SYSTEM FOR WORKS

(75) Inventor: Sung-Pil Choi, Og-dong Namgu Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/474,800

(22) Filed: Dec. 29, 1999

(30) Foreign Application Priority Data

Sep. 10, 1999 (KR) .................................................. 99-38587

(51) Int. Cl.[7] .................................................. G05D 1/00
(52) U.S. Cl. ........................................... 318/587; 134/95.2
(58) Field of Search ........................ 318/568.12, 568.13, 318/583, 587; 134/95.2, 104.1, 100.1, 102.1, 98.1, 110

(56) References Cited

U.S. PATENT DOCUMENTS

| | | | |
|---|---|---|---|
| 5,311,893 | * | 5/1994 | Nishi ..................................... 134/95.2 |
| 5,316,785 | * | 5/1994 | Yanai et al. ............................ 427/72 |
| 5,444,343 | * | 8/1995 | Enomoto et al. ............... 318/568.11 |
| 5,542,441 | * | 8/1996 | Mohindra et al. ................... 134/95.2 |
| 5,671,764 | * | 9/1997 | Murakami et al. ................... 134/200 |
| 5,776,257 | * | 7/1998 | Arnold et al. ......................... 134/11 |
| 5,868,865 | * | 2/1999 | Akimoto ................................ 134/33 |
| 6,004,190 | * | 12/1999 | Trampusch ............................. 451/89 |
| 6,068,393 | * | 5/2000 | Hutchins et al. ............... 364/468.19 |
| 6,082,381 | * | 7/2000 | Kamikawa et al. ............... 134/57 R |

* cited by examiner

*Primary Examiner*—Robert E. Nappi
*Assistant Examiner*—Rina I. Duda

(57) ABSTRACT

A washing robot system for works adapted to perform a washing operation with a minimum number of washing guns regardless of the number of areas to be washed formed at the work to speedily cope with change of types of the works, the system comprising: a washing room for preventing the washing solution from being spread while a works is washed and for restricting a worker from approaching thereto; an industrial robot for washing a predetermined area formed at the work in the washing room; a supply mechanism for supplying the washing solution and air to the robot gun mounted on the industrial robot; a conveying system for conveying the work into the washing room; and a control mechanism for controlling the industrial robot for washing the work.

8 Claims, 3 Drawing Sheets

FIG. 3 (PRIOR ART)
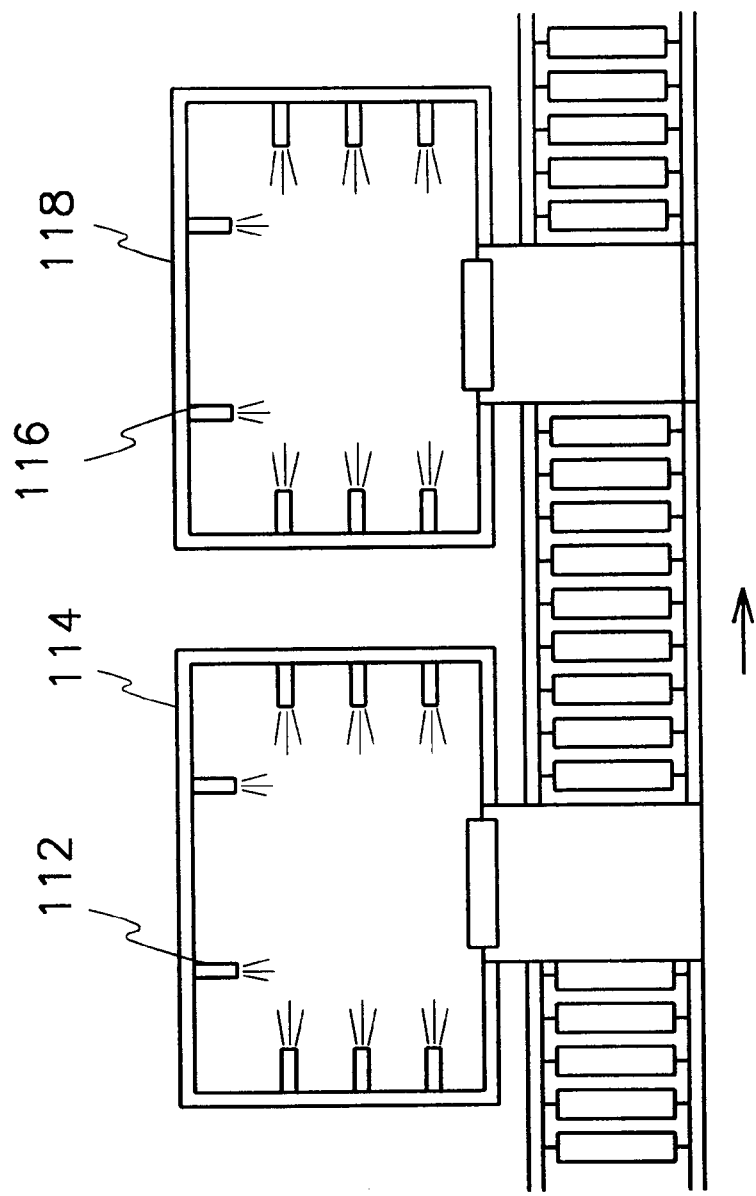
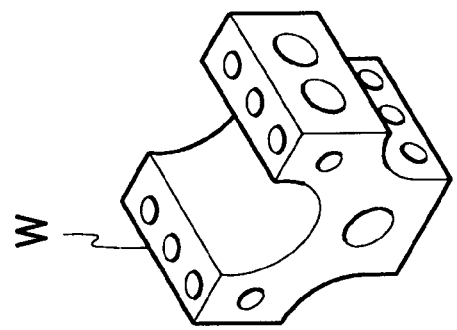

WASHING ROBOT SYSTEM FOR WORKS

BACKGROUND OF THE INVENTION

1. Field of the Invention

The present invention relates to a washing robot system for works, and more particularly to a washing robot system for works for automatically washing a processed work by way of a robot system to speedily perform a washing operation.

2. Description of the Prior Art

Generally, when a work is processed, chips or processing oil and the like according to the processing stays with the work and in order to remove same, a washing process is provided at the middle of the in-process or at the final process.

In case a work is of a relatively simple shape, a worker can remove the chips and the like by using an air blowing device and blowing air to a part where the chips and the like stay. However, in case of a work process of an engine cylinder block or a cylinder head where many hole processes are involved, many parts need washing and washing degrees are variably needed to necessitate an installation of a separate washing device for removing chips and the like.

Now, a washing device according to the prior art arranged at an in-process of a work for washing chips and the like will be described with reference to FIG. 3, where, the washing device includes a washing nozzle 112 for ejection washing solution to an area such as a tapping hole of a work (W) or an oil hole where chips remains unwashed, a washing room 114 to which the washing nozzle is attached, an air nozzle 116 for finally removing by air remnants still remaining at the work (W) washed by the washing room 114, and an air blowing room 118 to which the air nozzle 116 is fixedly attached.

When a work having finished a hole process and the like conveyed to a washing room by a worker or by a conveying system, the work is washed at a washed-to-be area by the washing nozzle. The worker then inserts the work to an air blowing device, where the work is blown by air and the blown work is moved to the next process for completion of the washing operation.

SUMMARY OF THE INVENTION

However, there is a problem in the washing method by way of a washing nozzle fixed to a washing room thus described in that the washing nozzle should be arranged in the same number as that of the area (to be washed) formed at a work, thereby increasing an installation cost thereof, and when type of the work is changed, position of the washing nozzle should be changed in accordance with the change of the type of the work, resulting in consumption of many hours in setting up to process and difficulty in swiftly coping with the change of type of the work.

There is another problem in that because the washing room and the air blowing room are separately arranged, washing process is divided into two sub processes prolonging the entire processing time.

The present invention is disclosed to solve the aforementioned problems and it is an object of the present invention to provide a washing robot system for works constructed and arranged to perform the washing operation by way of minimum washing guns regardless of the number of the area to be washed (hereinafter referred to as area) formed at the work, to swiftly cope with the change of work.

In accordance with the object of the present invention, there is provided a washing robot system for works, the system comprising:

a washing room for preventing washing solution from being spread while a work is washed and for restricting a worker from approaching thereto;

an industrial robot having a robot gun for washing a predetermined area formed at the work in washing room;

a supply mechanism for supplying the washing solution and air to the robot gun mounted on the industrial robot;

a conveying system for conveying the work into the washing room; and a control mechanism for controlling the industrial robot for washing the work.

BRIEF DESCRIPTION OF THE DRAWINGS

For fuller understanding of the nature and objects of the invention, reference should be made to the following detailed description taken in conjunction with the accompanying drawings in which:

FIG. 3 is a plan view of a washing mechanism of a work according to the prior art.

DETAILED DESCRIPTION OF THE INVENTION

Preferred embodiment of the present invention will now be described in detail with reference to the accompanying drawings.

Figure 1:
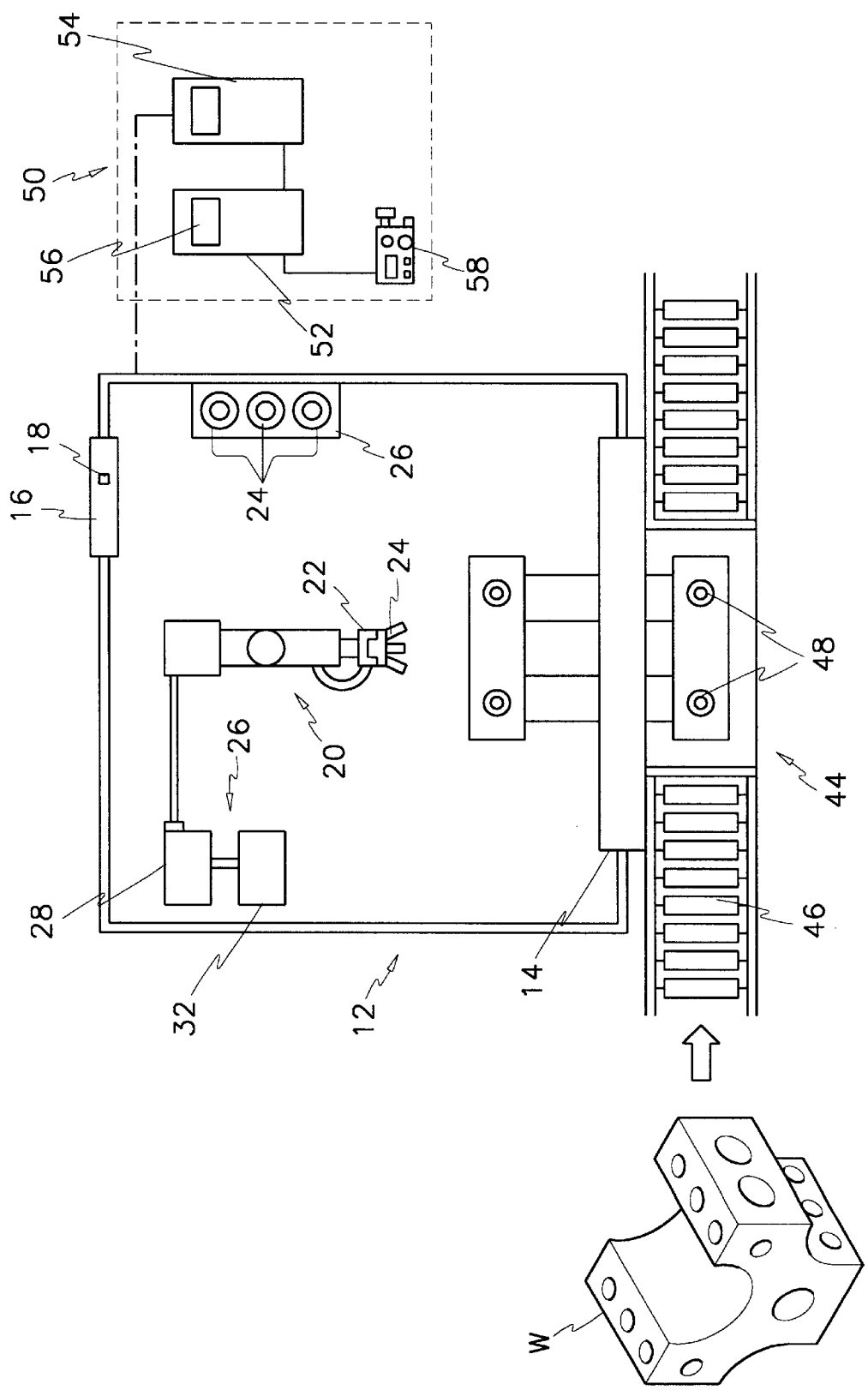
FIG. 1 is a block diagram for illustrating a robot system according to the present invention.
Figure 2:
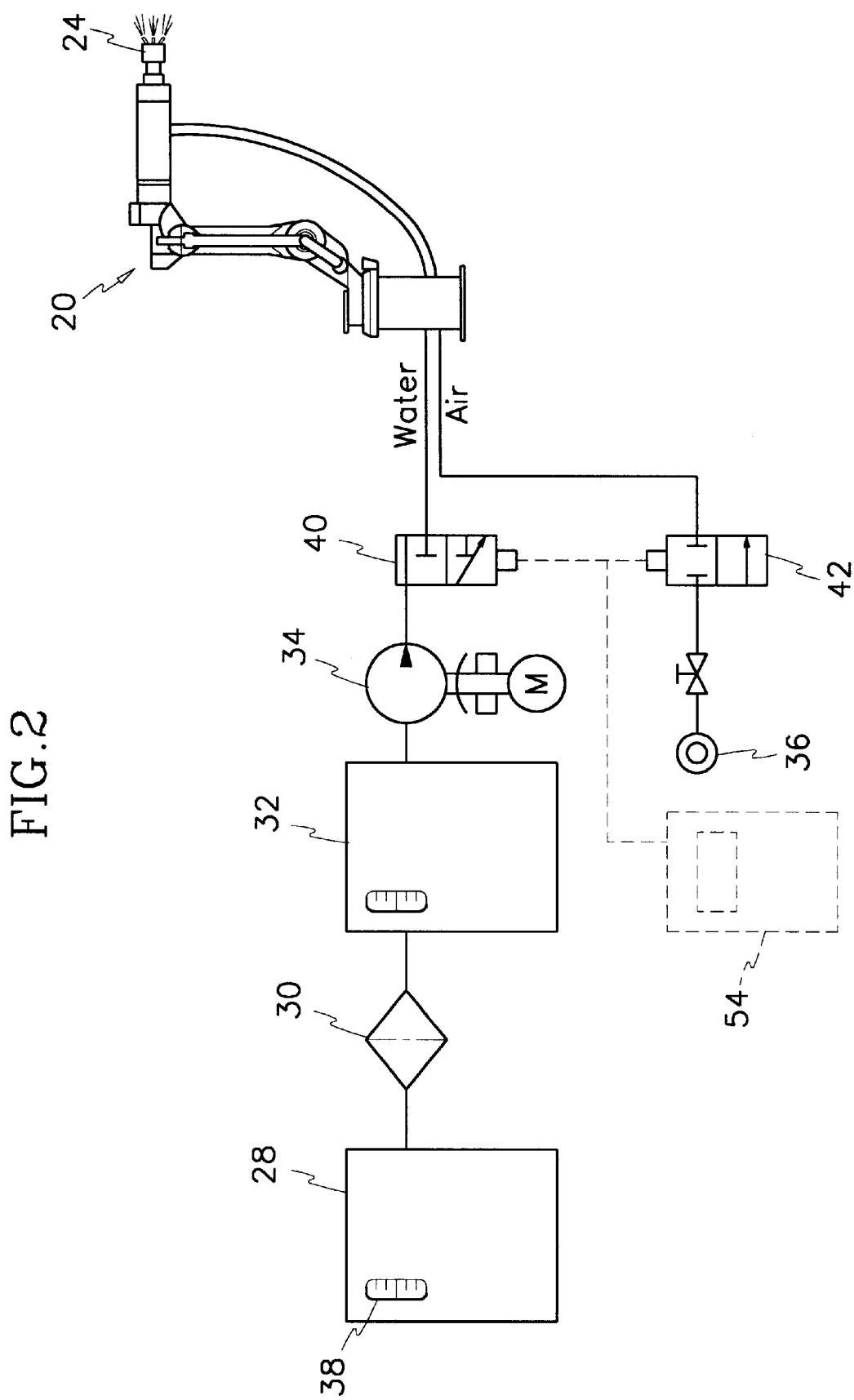
FIG. 2 is a block diagram for illustrating a supply mechanism for supplying washing solution and the like to the robot system according to the present invention.

FIGS. 1 and 2 illustrate preferred embodiment of the present invention, where reference numeral 12 in FIG. 1 defines a washing room where a robot system according to the present invention is installed.

The washing room 12 serves to restrict the approach of a worker from outside when a washing operation on a work (W) is performed. The room 12 is tightly sealed to prevent the washing solution from being spread and is equipped with a first door 14 for input and output of the work (W) and a second door 16 for a worker to enter.

The second door 16 is formed with a safety sensor 18, as a safety measure against the robot system according to the present invention, for detecting openness of the second door 16 of the washing room 16 while the work is being washed.

The safety sensor 18 is a sensor which breaks at a contact point when the second door 16 is opened and selects a specification which does not allow a sensing function to decrease according to spread washing solution.

The industrial robot 20 is a robot which is operated by a teaching program programmed to the control mechanism, such that it is preferably to use a 6-axle multi-articulated robot because articulated movement of a robot should be free-wheeling for washing various areas of a work.

A robot arm formed at a final articulation of the industrial robot 20 is mounted with a robot gun 24 for washing the work. The robot gun 24 is accommodated and awaited in a gun station 25 of the washing room while a washing operation is not performed and the robot arm 22 is finger-shaped to clamp the robot gun 24.

Meanwhile, because an area formed at a work varies in depth and radius thereof, and in order to properly washing the area, an injection speed and injection quantity of washing solution should be varied according to each area.

Furthermore, because a small quantity of chip and the like stays on the work even after the washing operation, there is a need to finally remove the remnant by way of air.

It is therefore preferable to construct the robot gun 24 in a plurality of washing guns, each having a different radius according to the area and an air gun form removing the remaining substances on the area by way of air.

The supply mechanism 26 for supplying the washing solution and the like to the robot gun 24 includes, as illustrated in FIG. 2, a first washing tank 28 for storing unfiltered the washing solution for washing the work, a filter 30 for filtering the washing solution in the first washing tank 28, a second washing tank 32 for storing the washing solution filtered by the filter 30, a supply pump 34 for receiving the washing solution from the second washing tank 32 to supply same to the robot gun 24, and an air supply source 36 for supplying air to the robot gun 24.

The first washing tank 28 is formed with a fluid amount gauge 38 for a naked eye to check the washing solution therein from outside, and the filter 30 serves to filter foreign objects such as chips and the like contained in the washing solution several times.

The washing solution and air respectively supplied from the washing solution supply pump 34 and the air supply source 36 are supplied to the robot gun 24 via solenoid valves 40 and 42 controlled by the control mechanism.

Meanwhile, the conveying mechanism 44 includes a servies of conveyors 46 and various sensor mechanism, where the work is conveyed from the prior process of the robot system according to the present invention to the present robot system, a signal from the control mechanism is received to input the work into the washing room, and the work having finished the washing is again extracted to be conveyed to the next process of the present robot system. The conveying mechanism 44 further includes a standard pin 48 for beinhg inserted into a tooling hole provided at the work.

The control mechanism 50 for generally controlling the robot system according to the present invention thus constructed is divided into a robot controller 52 for controlling the industrial robot 20 and a main controller 54 for controlling other devices.

There is a correlation between the teaching program input to the robot controller 52 and the Programmable Logic Controller (PLC) input to the main controller 54, and the entire system control is done by the main controller 54, whereas the teaching program of the robot controller 52 receives a start signal from the main controller 54 for commencement. The robot controller 52 includes a microcomputer 56 for storing and executing the teaching program and a jog shuttle 58 for teaching the operation of the robot, where the teaching program stored in storing mechanism is input with motion method of the robot, motion speed, motion displacement, input/output control of external devices at the robot and the like, and each teaching program is executed in division according to type of the work.

Because contents of the teaching program vary according to the type of robot, detailed description thereto will be omitted from the present invention. The main controller 54 not only controls the robot controller 52 but also controls the entire mechanism related to the present invention such as open/close of door at the washing room, supply of washing solution, conveying of work and the like.

Now, operation of the robot system according to the present invention thus constructed will be described.

First of all, a work is conveyed to the robot system according to the present invention through the conveying mechanism 44, and when the work is input into the washing room 12, the first door 14 at the washing room is shut to start operation of the industrial robot 20. The industrial robot 20 starts operation according to teaching program for each type of work priorly input into the robot controller 52, and when the work is positioned at a predetermined area, the main controller 54 opens the solenoid valves 40 and 42 to allow the washing solution and air to be supplied from the supply mechanism 26 to the robot gun for commencement of the washing operation.

At this time, the main controller 54 controls the solenoid valves 40 and 42 to allow supply of only the washing solution or the air according to the area.

The industrial robot 20 is so programmed as to differently select the robot gun 24 according to each area from the gun station 25 and to wash the work, such that if the second door 16 at the washing room is inadvertantly opened while the robot is working, the safety sensor 18 is rendered inactive to stop operation of the robot.

When the washing operation of the industrial robot thus described is completed, the main controller 54 reopens the first door 14 at the washing room, where the conveying mechanism 44 collects the work having completed the washing from the washing room to convey same to the next process for complete termination of the washing operation by the robot system according to the present invention.

As apparent from the foregoing, there is an advantage in the washing robot system for works thus constructed according to the present invention in that a minimum number of washing gun and air gun can perform the washing operation, and even if type of work is changed, automatic change of only the teaching program can cope therewith to thereby necessitate no additional time for setting the washing process.

Furthermore, there is another advantage in that washing and air blowing in the washing room are sequentially performed by the robot to reduce the number of washing process to one process, thereby saving the entire processing time and manufacturing cost involved therein.

What is claimed is:

1. A washing robot system for works, the system comprising:
   a washing room for preventing washing solution from being spread while a work is washed and for restricting a worker from approaching thereto;
   an industrial robot for washing a predetermined area formed at the work in the washing room, wherein the said washing room further comprising a safety sensor for detecting an openness of a door at the washing room when the industrial robot is operating the washing, to thereby send a signal to the control mechanism for stopping the operation of the industrial robot;
   a supply mechanism for supplying the washing solution and air to a robot gun mounted on the industrial robot;
   a conveying system for conveying the work into the washing room; and
   a control mechanism for controlling the industrial robot for washing the work.

2. The system as defined in claim 1, wherein the robot gun comprises:
   a plurality of washing guns for differentiating a discharge hole according to part of area of the work and washing the work; and
   an air gun for injecting air for removing remnants on the work after the work is washed by the washing guns.

3. The system as defined in claim 1, wherein the supply mechanism comprises:
- a first washing tank for storing unfiltered the washing solution for washing the work;
- a filter for filtering the washing solution in the first washing tank;
- a second washing tank for storing the washing solution filtered by the filter;
- a washing solution supply pump for receiving the washing solution from the second washing tank; and
- an air supply source for supplying air to the robot gun.

4. The system as defined in claim 1, wherein said industrial robot is a 6-axle multi-articulated robot.

5. A washing robot system for works, the system comprising:
- a washing room for preventing washing solution from being spread while a work is washed and for restricting a worker from approaching thereto;
- an industrial robot for washing a predetermined area formed at the work in the washing room;
- a supply mechanism for supplying the washing solution and air to a robot gun mounted on the industrial robot;
- a conveying system for conveying the work into the washing room; and
- a control mechanism for controlling the industrial robot for washing the work,
- wherein the said control mechanism comprising:
- a robot controller having a jog shuttle for teaching the operation of the industrial robot and a microcomputer for storing the teaching program and executing same; and
- a main controller connected to the robot controller for generally controlling the system.

6. The system as defined in claim 5, wherein the robot gun comprises:
- a plurality of washing guns for differentiating a discharge hole according to part of area of the work and washing the work; and
- an air gun for injecting air for removing remnants on the work after the work is washed by the washing guns.

7. The system as defined in claim 5, wherein the supply mechanism comprises:
- a first washing tank for storing unfiltered the washing solution for washing the work;
- a filter for filtering the washing solution in the first washing tank;
- a second washing tank for storing the washing solution filtered by the filter;
- a washing solution supply pump for receiving the washing solution from the second washing tank; and
- an air supply source for supplying air to the robot gun.

8. The system as defined in claim 5, wherein said industrial robot is a 6-axle multi-articulated robot.

\* \* \* \* \*